US012799779B2

(12) United States Patent
Wilke et al.

(10) Patent No.: US 12,799,779 B2
(45) Date of Patent: Nov. 17, 2026

(54) OPERATING MECHANISM FOR OPERATING VEHICLE DOORS

(71) Applicant: Illinois Tool Works Inc., Glenview, IL (US)

(72) Inventors: Zsolt Wilke, Bad Mergentheim (DE); Erik Dilje, Würzburg (DE); Fritz Göbel, Würzburg (DE); Thomas Lechner-Watzlik, Weikersheim (DE); Sebastian Öffner, Güntersleben (DE); Andreas Rudolf, Eibelstadt (DE)

(73) Assignee: Illinois Tool Works Inc., Glenview, IL (US)

( * ) Notice: Subject to any disclaimer, the term of this patent is extended or adjusted under 35 U.S.C. 154(b) by 175 days.

(21) Appl. No.: 18/765,519

(22) Filed: Jul. 8, 2024

(65) Prior Publication Data

US 2025/0020002 A1 Jan. 16, 2025

(30) Foreign Application Priority Data

Jul. 12, 2023 (DE) ..................... 10 2023 118 457.1
Dec. 28, 2023 (DE) ..................... 10 2023 136 754.4

(51) Int. Cl.
*E05B 85/10* (2014.01)
*E05B 81/76* (2014.01)
*E05B 81/34* (2014.01)

(52) U.S. Cl.
CPC ............ *E05B 81/76* (2013.01); *E05B 85/103* (2013.01)

(58) Field of Classification Search
CPC ...... E05B 85/10; E05B 85/103; E05B 85/107; Y10S 292/31
USPC ....................................................... 292/336.3
See application file for complete search history.

(56) References Cited

U.S. PATENT DOCUMENTS

| | | | | | |
|---|---|---|---|---|---|
| 2,017,244 | A * | 10/1935 | Gudmundsen | E05F 11/382 49/351 |
| 8,451,087 | B2 | 5/2013 | Krishnan | |
| 8,690,204 | B2 * | 4/2014 | Lang | E05B 85/103 292/DIG. 31 |
| 8,701,353 | B2 * | 4/2014 | Patel | E05B 85/103 292/201 |
| 9,540,852 | B2 | 1/2017 | Thomas | |
| 10,167,656 | B2 * | 1/2019 | Park | E05B 81/42 |

(Continued)

FOREIGN PATENT DOCUMENTS

| | | | |
|---|---|---|---|
| DE | 3313100 | A * | 8/1984 |
| DE | 3403003 | C2 | 1/1986 |

(Continued)

*Primary Examiner* — Carlos Lugo
(74) *Attorney, Agent, or Firm* — McAndrews, Held & Malloy, Ltd.

(57) ABSTRACT

An actuating mechanism for actuating a vehicle door includes a manually actuatable handle part movable between a home position, in which the handle part is recessed in a vehicle shell, and an actuating position, in which the handle part at least partially protrudes from the vehicle shell to create a gripping region between the handle part and an exterior of the vehicle. An actuator associated with the handle part transfers the handle part between the home and actuating positions. The actuator is configured as a rotary drive having a rotationally driveable drive wheel and a gearing mechanism that converts rotational movement of the drive wheel into linear movement of the handle part.

20 Claims, 11 Drawing Sheets

(56) References Cited

U.S. PATENT DOCUMENTS

| | | | | |
|---|---|---|---|---|
| 11,131,126 | B2 * | 9/2021 | Ehrlich | E05B 85/10 |
| 11,214,994 | B2 * | 1/2022 | Han | E05B 81/90 |
| 11,512,506 | B2 | 11/2022 | Sobecki | |
| 11,725,431 | B2 * | 8/2023 | Moriyama | E05B 81/06<br>292/336.3 |
| 11,859,419 | B2 * | 1/2024 | Chen | E05B 85/103 |
| 2019/0234117 | A1 * | 8/2019 | Bextermöller | E05B 85/103 |
| 2023/0265707 | A1 * | 8/2023 | Alneri | E05B 85/18 |
| 2025/0146335 | A1 * | 5/2025 | Bruecklmeier | E05B 17/10 |

FOREIGN PATENT DOCUMENTS

| | | | | |
|---|---|---|---|---|
| DE | 102006018187 | A1 * | 10/2007 | E05B 85/107 |
| DE | 102013212198 | A1 | 1/2014 | |
| DE | 202017104564 | U1 | 10/2017 | |
| DE | 202017104635 | U1 | 10/2017 | |
| DE | 102016113167 | A1 * | 1/2018 | E05B 85/103 |
| DE | 102010056437 | B4 | 6/2020 | |
| DE | 102020132363 | A1 | 6/2021 | |
| DE | 102022112427 | A1 * | 11/2023 | E05B 77/02 |
| EP | 3430217 | B1 | 1/2022 | |
| EP | 3810874 | B1 | 7/2022 | |
| EP | 3263811 | B1 | 1/2023 | |
| FR | 2800784 | A1 * | 5/2001 | E05B 85/107 |
| FR | 3075846 | B1 | 4/2022 | |

* cited by examiner

OPERATING MECHANISM FOR OPERATING VEHICLE DOORS

RELATED APPLICATIONS

The present application claims the benefit of German Patent Application No. 10 2023 118 457.1, filed Jul. 12, 2023, and German Patent Application No. 10 2023 136 754.4, filed Dec. 28, 2023, both titled "Operating Mechanism for Operating Vehicle Doors," the contents of which are hereby incorporated by reference.

BACKGROUND

In particular in the automotive industry, doors and flaps are increasingly no longer opened and closed only manually, i.e. mechanically. Rather, the opening and closing movements, and in particular the unlocking of doors, are performed more frequently automatically, in particular electrically. For example, an electric motor is used here, which, when desired, drives a mechanism for locking and unlocking the doors and flaps. In order to generate a signal for opening and closing to such electric drives or the associated control apparatuses, a switch can be provided, which generates the desired signal by way of an actuation by the user. Such switches can be configured as push-buttons, which, when pressed in by the user, generate the aforementioned signal.

In addition to the release switches, pull handles are required in order to be able to pull open the doors after unlocking. The handle and push-buttons are often difficult to reach with one hand movement, so that the unlocking and pulling open of doors must be done separately.

For the above-mentioned reasons, the problem addressed by the present disclosure is to specify an actuating mechanism for actuating vehicle doors, which can be used for unlocking and simultaneously opening the vehicle door in a single movement. The novel actuating mechanism is intended to fit seamlessly into the overall appearance of the vehicle and in particular should not be noticeable to the viewer's eye.

SUMMARY

The present disclosure relates generally to an operating mechanism for operating vehicle doors, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures, where like or similar reference numbers refer to like or similar structures. The figures are not necessarily to scale, emphasis instead being placed upon illustrating the principles of the devices, systems, and methods described herein.

DETAILED DESCRIPTION

Figure 1:
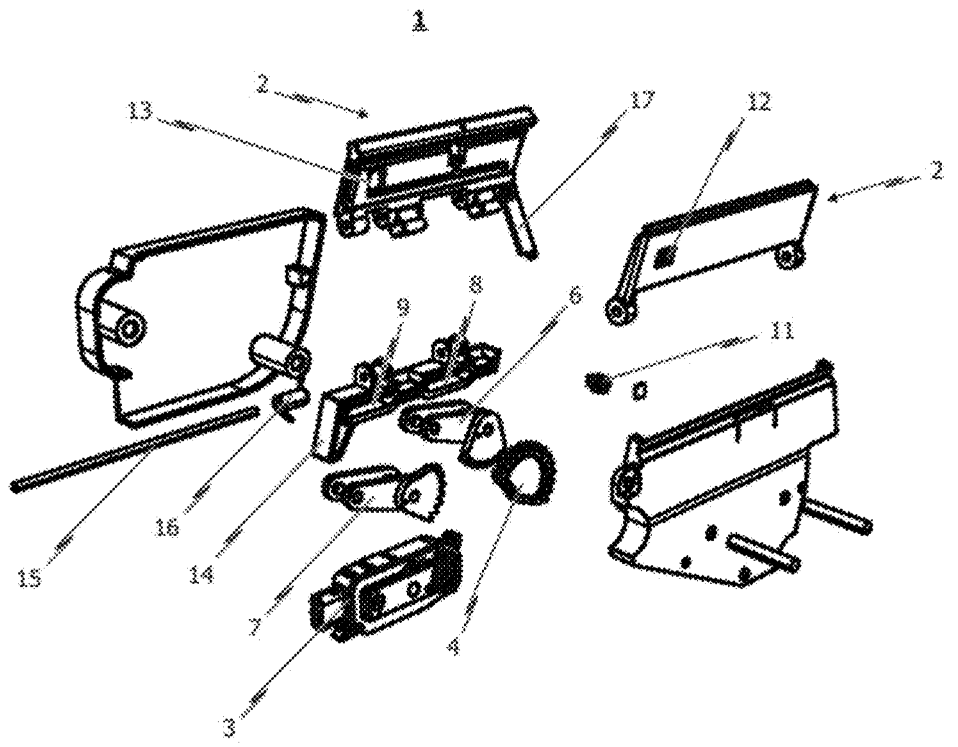
FIG. 1 illustrates schematically and in an isometric exploded view, the exemplary aspect of the actuating mechanism according to the present disclosure for actuating a vehicle door, in particular configured as a vehicle exterior door.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The present disclosure relates to an actuating mechanism for actuating a vehicle door, in particular for unlocking and opening vehicle doors. The present disclosure further relates to a vehicle having an actuating mechanism for unlocking and opening vehicle doors.

Accordingly, the present disclosure relates to an actuating mechanism for actuating, in particular unlocking and opening, vehicle doors, wherein the actuating mechanism comprises the following: a manually actuatable handle part, which can be transferred between a home position in which the handle part is preferably completely recessed in the vehicle shell, in particular within the vehicle door and an actuating position in which the handle part at least partially or regionally protrudes out of the vehicle shell such that a gripping region is created between the handle part and an exterior of the vehicle, into which the hand or at least one finger of a user can be at least partially inserted; and an actuator associated with the handle part, in particular an electromotive actuator, which is configured so as to transfer the handle part from its home position into its actuating position and vice versa, as needed.

The actuating mechanism according to the disclosure is characterized in particular in that the actuator is configured as a rotary drive with a rotationally driven or driveable drive wheel, wherein the actuator comprises a gearing mechanism via which a rotational movement of the drive wheel is or can be switched into a linear movement of the handle part.

According to implementations of the actuating mechanism according to the disclosure, it is provided that the gearing mechanism comprises a first lever element and at least one second lever element, wherein the first and at least one second lever element are operatively connected to the drive wheel via a first end region and to a coupling element associated with the handle part via an opposing second end region, respectively.

In this context, it is contemplated that the drive wheel is at least regionally configured as a gear, in particular as a gear segment, preferably as a spur gear, in particular a spur gear segment, and wherein, at the first end region of the first lever arm and at the first end region of the at least one second lever arm, one gear segment, preferably one spur gear segment, is provided, via which the corresponding lever arm is operatively connected to the drive wheel.

Alternatively or in addition to the last mentioned design variant, it can be provided that the second end region of the first and the at least one second lever element are operatively connected to the coupling element associated with the handle part via a respective closed cam disk mechanism.

Preferably, the closed cam disk mechanism comprises a first guide groove, in which a guide pin or T-nut provided at the second end region of the first lever element is at least partially or regionally received, and a second guide groove, in which a guide pin or T-nut provided at the second end region of the at least one second lever element is at least partially or regionally received.

It is contemplated that the first and second guide grooves extend at least partially or regionally and at least substantially perpendicular to a longitudinal direction of displacement of the handle part.

According to implementations of the actuating mechanism according to the disclosure, it is provided that the handle part is pivotally connected to the coupling element about an axis of rotation extending at least substantially perpendicular to a longitudinal direction of displacement of the handle part.

In this context, it is expedient that the handle part is connected to the coupling element via a bearing, in particular via a radial bearing, and is configured so as to be pivotable relative to the coupling element between a home position of the handle part and an actuating position of the handle part, in particular upon a manual actuation of the handle part, preferably solely in the actuating position of the handle part.

In a further development thereof, it is provided that a spring element, in particular in the form of a torsion spring, is associated with the bearing and is configured so as to bias the handle part into its home position, preferably solely in the actuating position of the handle part.

According to implementations of the actuating mechanism according to the disclosure, it is provided that the actuating mechanism further comprises a first sensor apparatus configured so as to generate an electrical signal for unlocking the vehicle door upon a use of the handle part.

In aspects of the actuating mechanism according to the disclosure, the first sensor apparatus is configured so as to detect a pivoting movement of the handle part relative to the coupling element, in particular in an actuating position of the handle part, and to generate the electrical signal for unlocking the vehicle door.

In this context, it is expedient that the handle part is operatively connected to a lever element such that a movement that is generated in particular upon a manual actuation of the handle part is or can be transferred to the first sensor apparatus so as to trigger it.

Particularly preferably, it is provided that the actuating mechanism further comprises a first sensor apparatus configured so as to generate an electrical signal for unlocking the vehicle door upon a use of the handle part.

In principle, it is contemplated that the actuating mechanism comprises a cover, which closes in the home position of the handle part substantially flush with the vehicle shell or an exterior of a vehicle and covers the handle part.

According to a first design variant of the actuating mechanism, it is provided that the actuating mechanism is configured so as to move the handle part relative to the vehicle shell in a first plane in order to transfer the handle part between the home position and the actuating position, wherein the actuating mechanism can be connected to a vehicle shell in such a way that movements of the handle part relative to the vehicle shell outside the first plane are prevented.

According to an alternative second design variant of the actuating mechanism, it is provided that the actuating mechanism is configured so as to transfer the handle part relative to the vehicle shell between the home position and the actuating position in such a way that the handle part is moved on the one hand out of the vehicle shell and on the other hand away from the exterior of the vehicle.

Preferably, the handle part comprises an actuating surface, wherein the first sensor apparatus is configured so as to generate the electrical signal when the actuating surface is contacted or deformed, and wherein the actuating surface is oriented towards the handle region in the actuating position of the handle part.

In particular, the first sensor apparatus can comprise a switch, in particular a microswitch, an inductive sensor, and/or a capacitive sensor.

According to implementations of the actuating mechanism according to the disclosure, it is provided that the actuating mechanism comprises a second sensor apparatus, which is configured so as to detect an approximation of an authorized operator and, upon detection of an authorized operator, to generate a control signal for transferring the handle part into the actuating position. For example, the second sensor apparatus can be an RFID tag or an NFC sensor that communicates with the vehicle key in a remote manner.

According to a further aspect, the actuating mechanism does not comprise a Bowden pull. In other words, the actuating mechanism according to the present disclosure is merely a so-called "e-latch," which is configured so as to generate electronic unlocking signals. Accordingly, in the following actuating mechanism, a mechanical unlocking is not provided, in order to construct the actuating mechanism in as space-saving a manner as possible. However, when using the actuating mechanism, it can be provided that a mechanical emergency-release mechanism is included somewhere else.

According to a further aspect, the present disclosure relates to an actuating mechanism for actuating, in particular unlocking and opening, vehicle doors, wherein the actuating mechanism comprises the following:

- an actuating means, in particular with a handle, for opening vehicle doors; and
- a first sensor apparatus configured so as to generate an electrical signal for unlocking a vehicle door upon use of the actuating means,
- wherein the actuating means can be transferred between a home position in which the actuating means is recessed in the vehicle shell, in particular within the vehicle doors, of a vehicle and an actuating position in which the actuating means protrudes out of the vehicle shell such that a gripping region is created between the actuating means and the exterior of a vehicle.

The actuating mechanism comprises an actuating means, the activation of which leads to the generation of an electrical unlocking signal. The actuating mechanism can in particular be used in order to generate the electrical signal and simultaneously to pull, i.e. open, the vehicle doors after they have been unlocked by the electrical signal.

The actuating means can be recessed in the vehicle shell so that, in a home position, it is not visible or only visible with difficulty for the user. In addition to the aesthetic advantages, an aerodynamic advantage can also be achieved as a result, because, in the home position, the actuating means can in particular be arranged flush with the shell and thus not protrude above it. To actuate the actuating means, it can be transferred into an actuating position in which at least a portion of the actuating means protrudes from the vehicle shell. In the actuating position, the actuating means should be spaced at least so far from the exterior of a vehicle that a gripping region is created between the exterior of the vehicle and a user-facing surface of the actuating means. The user can use this gripping region in order to reach around/rearwardly engage with the actuating means and open the vehicle door or flap.

According to a further aspect, the actuating mechanism comprises a cover that, in the home position, terminates substantially flush with the vehicle shell and covers the actuating means. The cover can either be attached directly to the actuating means or it can be formed separately. In a separate configuration, for example, the cover can be pivotally attached to the vehicle exterior and can be opened into its actuating position by the movement of the actuating means.

According to a further aspect, the actuating mechanism comprises an electrical actuator, which is connected to the actuating means and configured so as to transfer the actuating means between the home position and the actuating position. As a result, the actuating means can be automatically transferred from its home position into the actuating position, for example, as soon as an authorized user approaches the vehicle. Accordingly, a vehicle having the present actuating mechanism can trigger a welcome impression as soon as the user approaches the vehicle.

According to a further aspect, the actuating mechanism is configured so as to rotationally transfer the actuating means between the home position and the actuating position. With a rotation of the actuating means between the home position and the actuating position, the control of the actuating means can be designed particularly simply and compactly. In particular, the actuating means can be connected to an electric motor directly or via a simple kinematics in order to transfer it between its end positions.

Alternatively, the actuating mechanism can be configured so as to translationally transfer the actuating means between the home position and the actuating position. With a translational transfer from the home position into the actuating position, it is possible, for example, to connect the actuating means to the vehicle shell in its actuating position in a simple and sealing manner so that the penetration of debris or water into the interior of the vehicle shell is effectively prevented.

According to a further aspect, the actuating mechanism is configured so as to move the actuating means in relation to a vehicle shell substantially in a first plane in order to transfer the actuating means between the home position and the actuating position, wherein the actuating mechanism can be connected to the vehicle shell in such a way that movements of the actuating means in relation to the vehicle shell are prevented outside of the first plane.

In other words, according to this aspect, the actuating means is only movable along the first plane. In directions of movement outside the first plane, for example perpendicular to the first plane, the actuating mechanism and thus the actuating means are substantially rigidly connected to the shell. According to this exemplary aspect, the actuating means is still movable between the two end positions, but, in any other direction of movement, it can be used in order to transfer a force onto the vehicle doors, for example in order to pull open the doors after unlocking them. In other words, in the actuating position, the actuating means appears to the user as a fixed door handle, which can be used for opening or closing the vehicle doors.

According to a further aspect, the actuating mechanism is configured so as to transfer the actuating means in relation to a vehicle shell between the home position and the actuating position such that the actuating means is moved out of the vehicle shell on the one hand and away from an exterior of the vehicle on the other hand. Accordingly, upon transfer into the actuating position, the gripping region can be configured so as to be a sufficient size.

According to a further aspect, the actuating means comprises an actuating surface, wherein the first sensor apparatus is configured so as to generate the electrical signal when the actuating surface is contacted or deformed, and wherein the actuating surface is oriented towards the gripping region in the actuating position of the actuating means. Depending on the configuration of the first sensor apparatus, the actuating surface can be configured differently. For example, a capacitive sensor can be a fixed actuating surface, the contact of which by the user already causes a response of the first sensor apparatus. By contrast, when using a microswitch, a deformable actuating surface can be used, which presses on the microswitch either directly or via a kinematics in order to generate the electrical signal. The actuating surface is oriented towards the vehicle shell or the exterior of the vehicle so that the user automatically contacts/activates the actuating surface when the actuating means is rearwardly engaged, i.e. when grasping into the gripping region. Thus, it can be achieved in a very simple manner that the user can simultaneously control an unlocking via the actuating surface and, by pulling on the actuating means, can open the now unlocked door.

As already indicated above, the first sensor apparatus can comprise a switch, in particular a microswitch, an inductive sensor, or a capacitive sensor.

According to a further aspect, the actuating mechanism comprises a second sensor apparatus, which is configured so as to detect an approximation of an authorized operator and, upon detection of an authorized operator, to generate a control signal for transferring the actuating means into the actuating position.

In other words, the second sensor apparatus serves to automatically detect the presence of the user and, as a result, output a control signal, which ultimately leads to the actuating means being transferred into its actuating position. For example, the second sensor apparatus can be an RFID tag or an NFC sensor that communicates with the vehicle key in a remote manner.

The disclosure further relates to a vehicle having a vehicle shell and an actuating mechanism of the aforementioned type, wherein, in the home position, the handle part is recessed in the vehicle shell, in particular within a vehicle door, and, in the actuating position, the handle part protrudes from the vehicle shell such that a gripping region is created between the handle part and an exterior of the vehicle.

It is contemplated in this context that, in the actuating position, the handle part protrudes from the vehicle exterior at the height of an A-, B-, or C-pillar of the vehicle.

Alternatively, it is contemplated that the vehicle comprises at least one vehicle door window, wherein the vehicle door window is in particular received in the vehicle exterior in a recessable manner and is in contact with a window seal, and wherein, in the actuating position, the handle part protrudes above the window seal such that a gripping region is created between the handle part and the window.

An exemplary aspect of the actuating mechanism according to the disclosure is described in greater detail in the following, with reference to the drawings.

The exemplary aspect of the actuating mechanism 1 according to the disclosure as shown in the drawings serves to actuate a vehicle door, in particular to unlock and open a vehicle door, in particular a vehicle exterior door.

To this end, a manually actuatable handle part 2 is used, which can be transferred between a home position and an actuating position. FIG. 2, FIG. 5, FIG. 11, and FIG. 14 show the actuating mechanism 1 in the state in which the handle part 2 is in the home position. In the home position, the handle part 2 of the actuating mechanism 1 is preferably completely recessed in the vehicle shell, in particular within the vehicle door.

FIG. 3, FIG. 6, FIG. 12, and FIG. 16 show the actuating position of the handle part 2 of the actuating mechanism 1 according to the disclosure. In the actuating position of the handle part 2, the handle part 2 is at least partially or regionally extended out of the vehicle shell such that a gripping region is created between the handle part 2 and an exterior of the vehicle, in which the hand or at least one finger of a user can be at least partially inserted so as to actuate the handle part 2.

FIG. 4, FIG. 7, FIG. 13, and FIG. 17 show for example the handle part 2 in its actuated position, i.e. when the handle part 2 is "activated" in order to actuate a vehicle door.

The actuating mechanism 1 according to the exemplary aspect as shown in the drawings comprises in addition to the handle part 2 an actuator 3, which is associated with the handle part 2. This is in particular an electromotive actuator 3. The actuator 3 is configured so as to transfer the handle part 2 from its home position into its actuating position as needed, and vice versa.

In particular, the actuator 3 of the exemplary aspect of the actuating mechanism 1 according to the disclosure is configured as a rotary drive and comprises a rotationally driven or driveable drive wheel 4.

Furthermore, the actuator 3 of the actuating mechanism 1 according to the disclosure comprises a gearing mechanism 5, via which a rotational movement of the drive wheel 4 of the actuator 3 is or can be switched into a linear movement of the handle part 2. In other words, with the aid of the gearing mechanism 5, a rotational movement of the drive wheel 4 of the actuator 3 is translated into a linear movement of the handle part 2.

As can be seen for example from the exploded view according to FIG. 1, but also the views according to FIG. 2, FIG. 3, FIG. 4, FIG. 11, FIG. 12, and FIG. 13, the gearing mechanism 5 comprises a first lever element 6 as well as a second lever element 7, wherein the first and second lever elements 6, 7 are operatively connected to the drive wheel 4 of the actuator 3 via a first end region and to a coupling element 14 associated with the handle part 2 via an opposing second end region, respectively. The coupling element 14 is preferably a coupling element 14 serving as a "mediator."

The drive wheel 4 of the in particular electromotive actuator 3 is at least regionally configured as a gear, in particular as a gear segment, and preferably as a spur gear, in particular as a spur gear segment. At the first end region of the first lever arm 6 and at the first end region of the at least one second lever arm 7, one gear segment, preferably one spur gear segment, is provided, via which the corresponding lever arm 6, 7 is operatively connected to the drive wheel 4.

From the exploded view according to FIG. 1 and in particular from the illustrations in FIG. 3, FIG. 4, FIG. 12, and FIG. 13, it can be seen that the second end region of the first and second lever element 6, 7 are operatively connected to the coupling element 14 associated with the handle part 2 via a respective closed cam disk mechanism.

In particular, in the exemplary aspect of the actuating mechanism 1 according to the disclosure as shown in the drawings, it is provided that the closed cam disk mechanism comprises a first guide groove 8, in which a guide pin 10 or T-nut provided at the second end region of the first lever element 6 is at least partially or regionally received. In a similar manner, the closed cam disk mechanism comprises a second guide groove 9, in which a guide pin 10 or T-nut provided at the second end region of the at least one second lever element 7 is at least partially or regionally received.

It is provided in particular that the first and second guide grooves 8, 9 extend at least partially or regionally and at least substantially perpendicular to a longitudinal direction of displacement of the handle part 2.

The handle part 2 itself is pivotally connected to the coupling element 14 about an axis of rotation extending at least substantially perpendicular to a longitudinal direction of displacement of the handle part 2, so that, in the actuating position of the handle part 2, it can be transferred, and in particular be pivoted, into the activated actuating position.

In particular, it is provided here that the handle part 2 is connected to the coupling element 14 via a bearing 15, in particular via a radial bearing, and is configured so as to be pivotable relative to the coupling element 14 between an unactuated actuating position of the handle part 2 and an actuated (activated) actuating position of the handle part 2, in particular upon a manual actuation of the handle part 2, preferably solely in the actuating position of the handle part 2, when it is in the actuating position.

In particular, the exploded view according to FIG. 1 shows that a spring element 16, in particular in the form of a torsion spring, is associated with the bearing 15 and is configured so as to bias the handle part 2 into its unactuated actuating position, preferably solely in the actuating position of the handle part 2.

Figure 16:
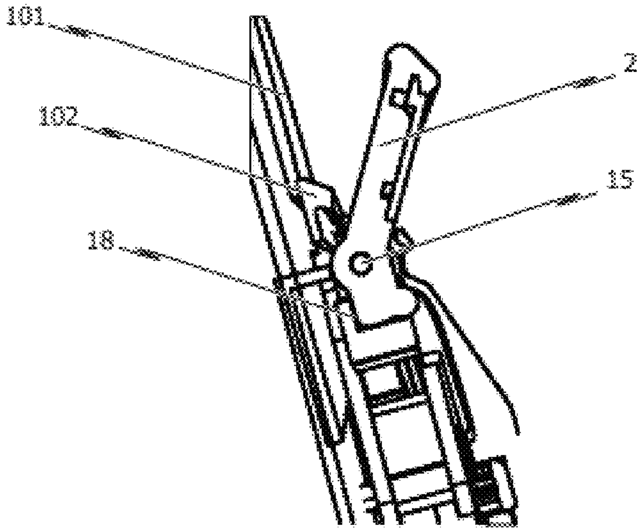
FIG. 16 illustrates schematically and in a lateral view, the exemplary aspect of the actuating mechanism in a state in which the handle part is in the actuating position.
Figure 17:
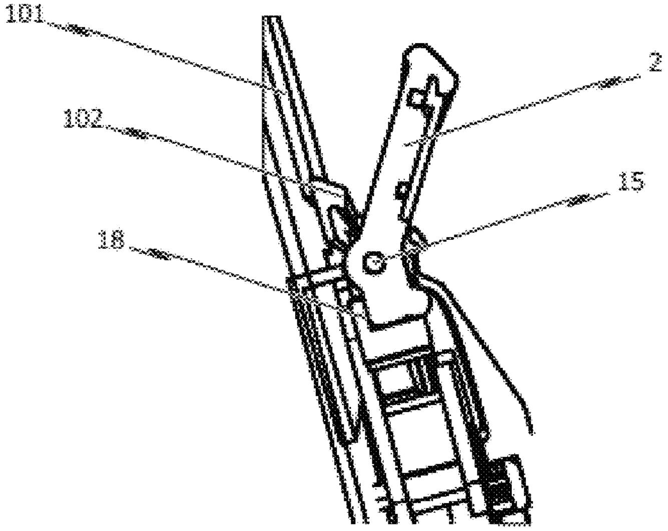
FIG. 17 illustrates schematically and in a lateral view, the exemplary aspect of the actuating mechanism according to the disclosure in which the handle part, starting from the actuating position shown in FIG. 16, is in an activated state in which a vehicle door has been actuated.

In FIG. 16, schematically and in a lateral view, the exemplary aspect of the actuating mechanism 1 according to the disclosure is shown in a state in which the handle part 2 is in its unactuated actuating position. In FIG. 17, the actuating mechanism 1 is shown in a state in which, by contrast, the handle part 2 is in the actuated actuating position.

A comparison between the illustrations in FIG. 16 and FIG. 17 shows that, for transferring the handle part 2 from the unactuated actuating position according to FIG. 16 into the actuated actuating position according to FIG. 17, the handle part 2 is pivoted over the pivot axis defined by the bearing 15. Here, an end stop 18 limits the movement or pivoting path of the handle part 2.

Due to the pivoting movement of the handle part 2 upon transfer of the handle part 2 from the unactuated actuating position, for example as shown in FIG. 16, into the actuated actuating position, for example as shown in FIG. 17, a first sensor apparatus 11 is activated, which generates an electrical signal for unlocking the vehicle door. In particular, the first sensor apparatus 11 is configured so as to detect a corresponding pivoting movement of the handle part 2 relative to the coupling element 14, in particular in the actuating position of the handle part 2, and to generate the electrical signal for unlocking the vehicle door.

For this purpose, a lever element 17 correspondingly associated with the handle part 2 is used, which is operatively connected to the handle part 2 such that a movement of the handle part 2 that is generated in particular upon a manual actuation of the handle part 2 is or can be transferred to the first sensor apparatus 11 so as to trigger it.

The first sensor apparatus 11 is in particular a switch, preferably a microswitch.

However, other design variants are also contemplated, for example an inductive sensor and/or a capacitive sensor, wherein, in the case of such alternative design variants, the lever element 17 associated with the handle part 2 or operatively connected to the handle part 2 can also be omitted.

Preferably, the first sensor apparatus 11 is configured so that it generates an electrical signal for unlocking the vehicle door only when it is in particular simultaneously detected by means of a second sensor apparatus 13, which is preferably an inductive or capacitive sensor, that the hand or at least one finger of the user has been inserted into the gripping region, which is created between the handle part 2 and the exterior of the vehicle when the handle part 2 is in its actuating position, i.e. when the handle part 2 at least partially or regionally protrudes out of the vehicle shell such that a gripping region is created between the handle part 2 and an exterior of the vehicle, into which the hand or at least one finger of a user can be at least partially inserted.

Figure 2:
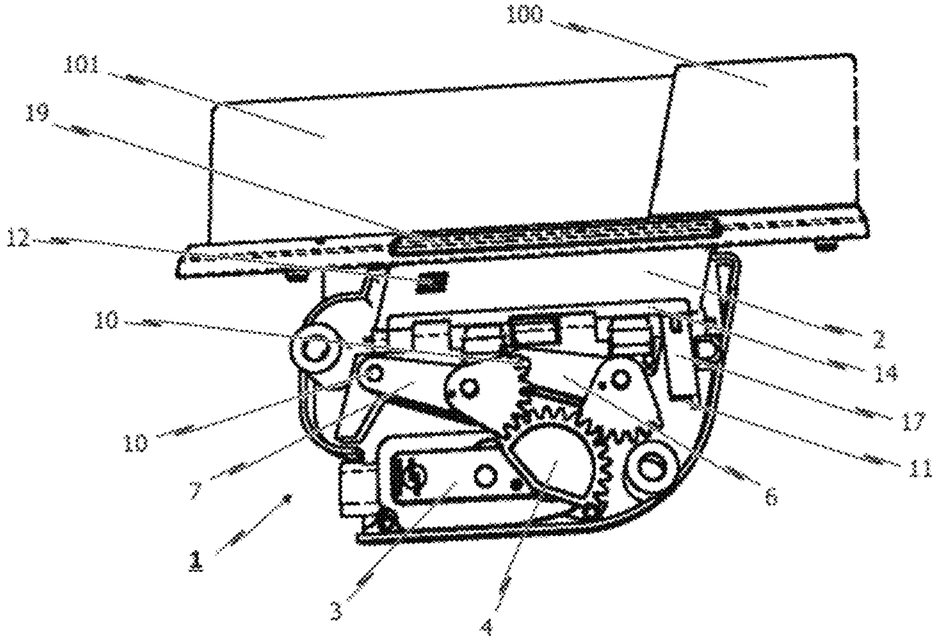
FIG. 2 illustrates schematically, the exemplary aspect of the actuating mechanism according to the disclosure in a state in which the handle part is in the home position, in which the handle part is completely recessed in the vehicle shell within the vehicle door.

Preferably, the actuating mechanism 1 comprises a cover 19, which, in the home position of the handle part 2, closes substantially flush with the vehicle shell or an exterior of a vehicle and covers the handle part 2 at least partially or regionally, as can be seen for example in the illustration in FIG. 2.

Generally speaking, the actuating mechanism 1 is configured so as to move the handle part 2 relative to the vehicle shell in a first plane in order to transfer the handle part 2 between the home position and the actuating position, wherein the actuating mechanism 1 can be connected to a vehicle shell, in particular such that movements of the handle part 2 relative to the vehicle shell outside the first plane are prevented. The aforementioned end stop 18 is used for this purpose.

On the other hand, the actuating mechanism 1 is configured so as to transfer the handle part 2 relative to the vehicle shell between the home position and the actuating position in such a way that the handle part 2 is moved on the one hand out of the vehicle shell and on the other hand away from the exterior of the vehicle, in order to transfer the handle part 2 from the unactuated actuating position into the actuated actuating position.

According to an alternative design variant, it is generally contemplated that the handle part 2 comprises an actuating surface 12, wherein the first sensor apparatus 11 is configured so as to generate a corresponding electrical signal for unlocking the vehicle door when the actuating surface 12 is contacted or deformed by the user and in particular by hand or finger of the user. In particular, in the actuating position of the handle part 2, the actuating surface 12 should be oriented towards the gripping region.

As already mentioned, it is generally contemplated that the actuating mechanism 1 comprises a second sensor apparatus 13, which is configured so as to detect an approximation of an authorized operator/user and, upon detection of an authorized operator/user, to generate a control signal for transferring the handle part 2 from the home position into the actuating position.

However, in principle, the disclosure is not limited to the second sensor apparatus 13 being configured so as to detect the approximation of an authorized operator. In principle, it is also contemplated that the second sensor apparatus 13 is configured as a capacitive sensor apparatus, for example, and merely detects the approximation of an operator.

The solution according to the disclosure, as shown by the exemplary aspect shown in the drawings, is characterized in particular in that the actuating mechanism 1 is configured without a Bowden pull or similar movable machine element for transferring a mechanical movement as well as compressive and tensile forces.

The disclosure further relates to a vehicle having a vehicle shell and an actuating mechanism 1 of the aforementioned type, wherein, in the home position, the handle part 2 is recessed in the vehicle shell, and, in the actuating position, the handle part 2 protrudes from the vehicle shell/exterior door such that a gripping region is created between the handle part 2 and an exterior of the vehicle.

Figure 3:
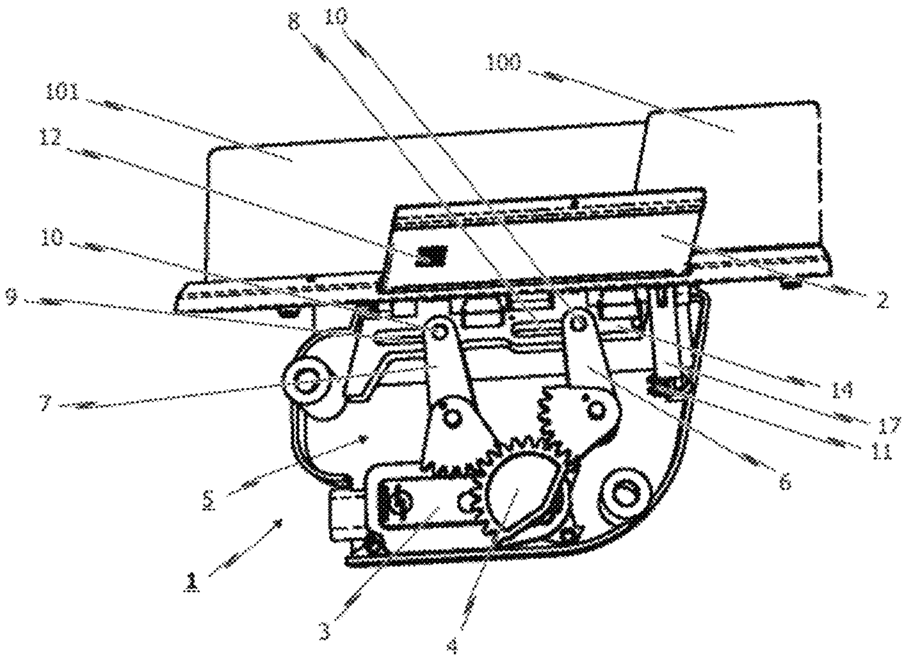
FIG. 3 illustrates schematically, the exemplary aspect of the actuating mechanism according to the present disclosure in a state in which the handle part, starting from the home position shown in FIG. 2, has been transferred into the actuating position in which the handle part protrudes out of the vehicle exterior door at least partially or regionally such that a gripping region is created between the handle part and an exterior of the vehicle, into which the hand or at least one finger of a user can be at least partially inserted.
Figure 4:
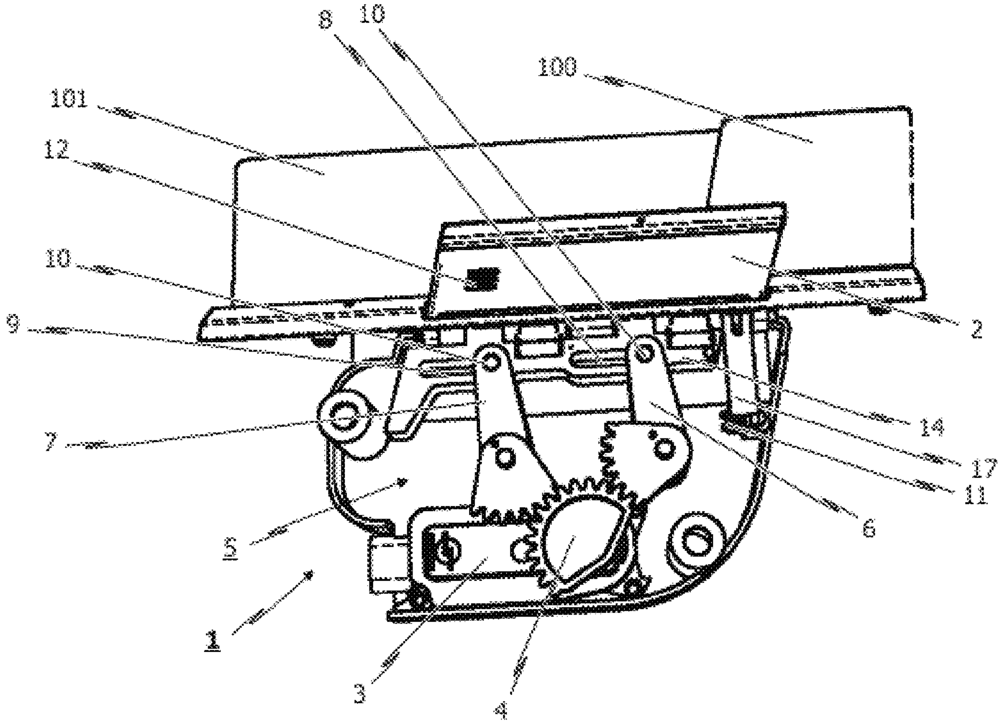
FIG. 4 illustrates schematically, the exemplary aspect of the actuating mechanism in a state in which the handle part, starting from the actuating position shown in FIG. 3, is in an activated state for actuating, in particular unlocking and opening, the vehicle door.
Figure 5:
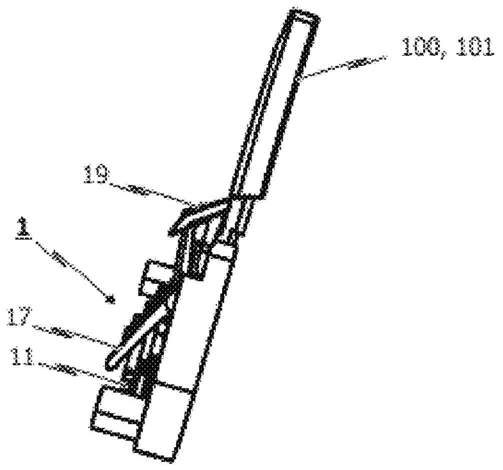
FIG. 5 illustrates schematically, the exemplary aspect of the actuating mechanism according FIG. 2 in a lateral view.
Figure 6:
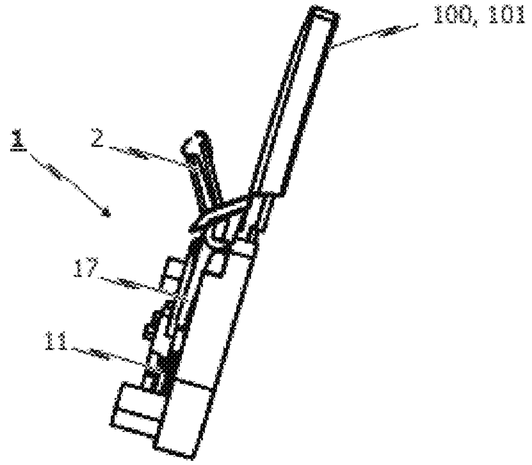
FIG. 6 illustrates schematically, the exemplary aspect of the actuating mechanism according to the disclosure according FIG. 3 in a lateral view.
Figure 7:
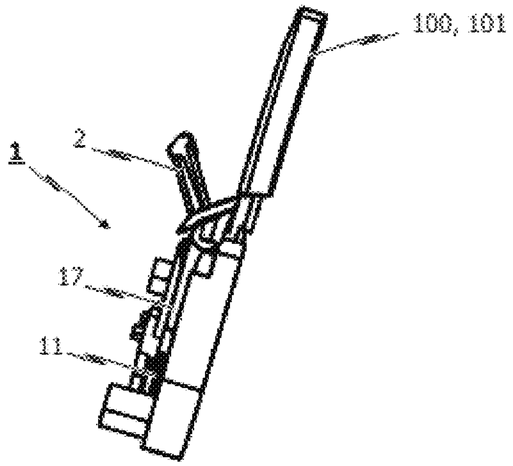
FIG. 7 illustrates schematically, the exemplary aspect of the actuating mechanism according to the disclosure according FIG. 4 in a lateral view.
Figure 8:
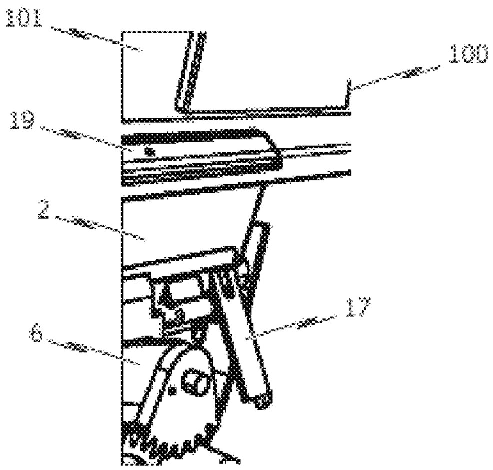
FIG. 8 illustrates schematically, a detail view of the exemplary aspect of the actuating mechanism according to the disclosure according FIG. 2.
Figure 9:
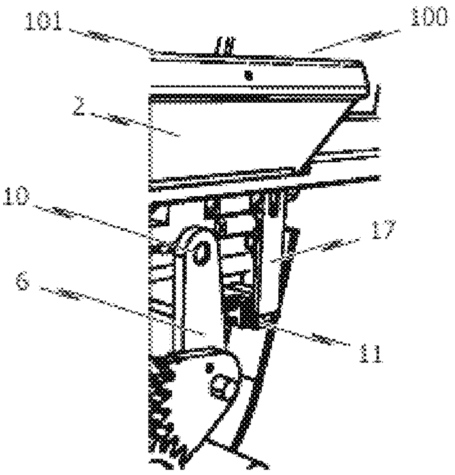
FIG. 9 illustrates schematically, a detail view of the exemplary aspect of the actuating mechanism according to the disclosure according FIG. 3.
Figure 10:
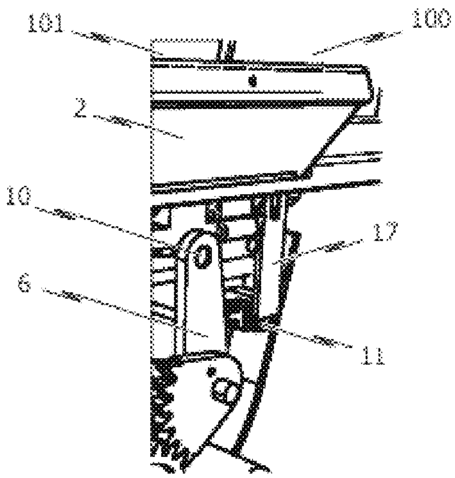
FIG. 10 illustrates schematically, a detail view of the exemplary aspect of the actuating mechanism according to the disclosure according FIG. 4.
Figure 11:
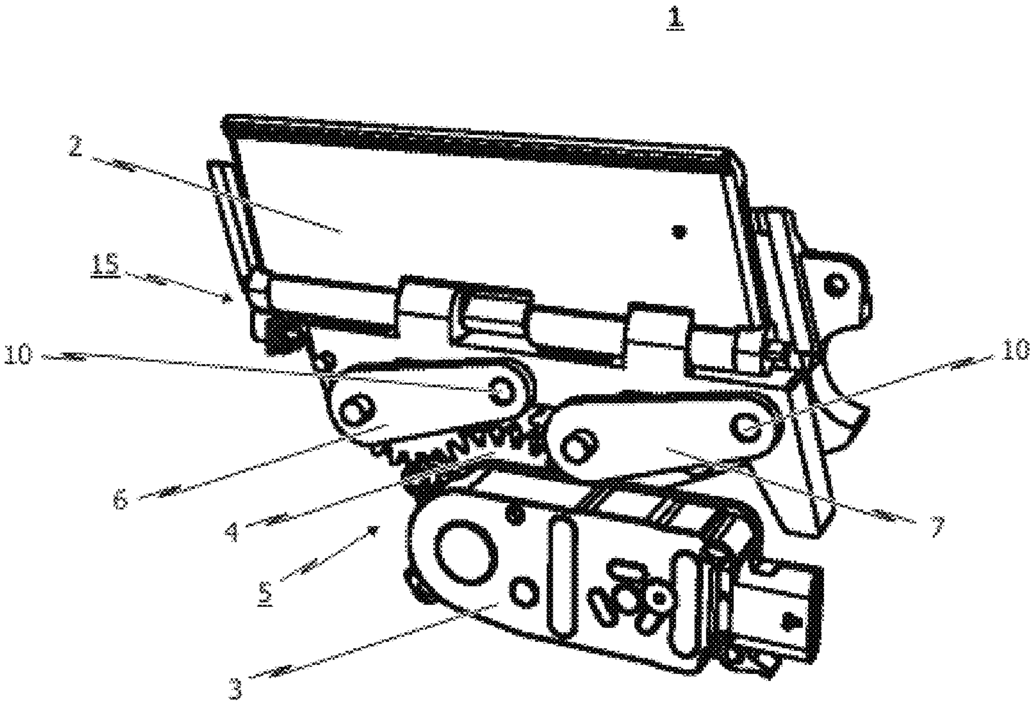
FIG. 11 illustrates schematically and in an isometric view, the exemplary aspect of the actuating mechanism according to the disclosure according to FIG. 2.
Figure 12:
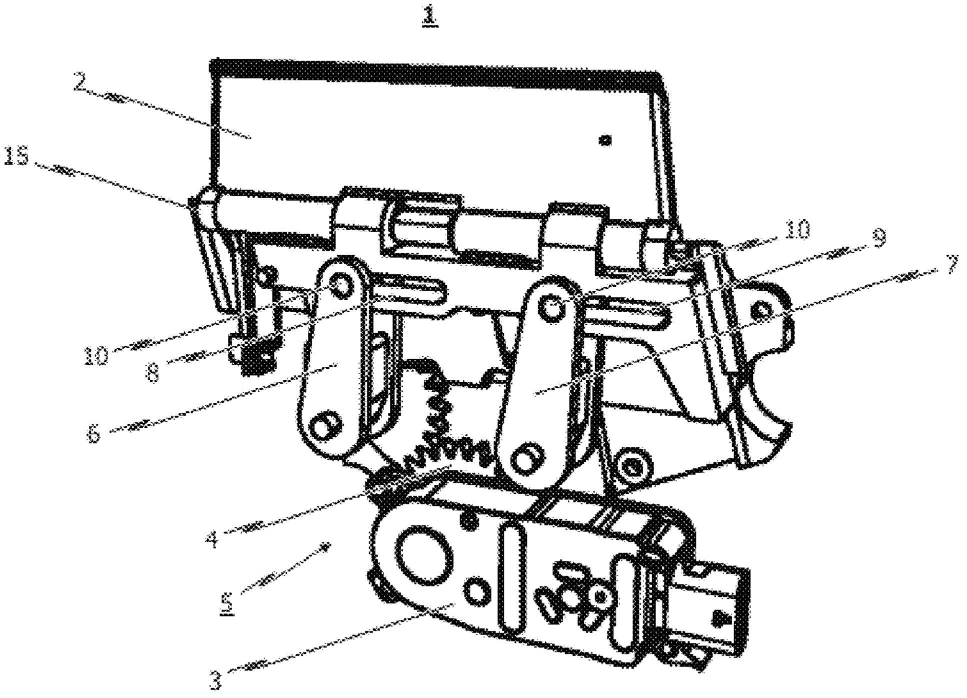
FIG. 12 illustrates schematically and in an isometric view, the exemplary aspect of the actuating mechanism according to the disclosure according to FIG. 3.
Figure 13:
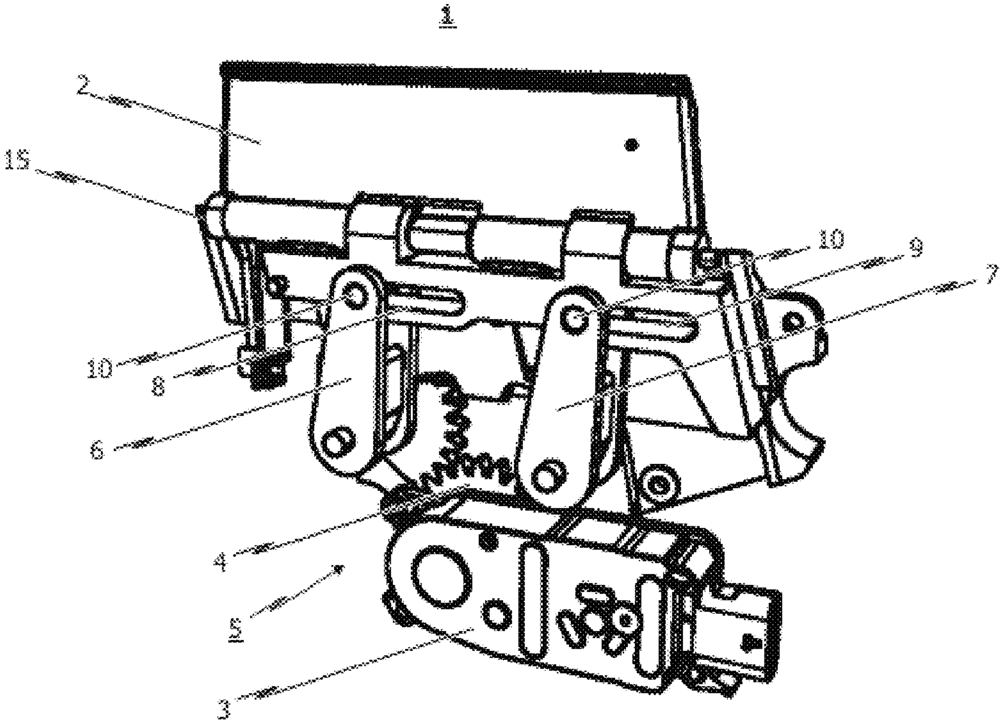
FIG. 13 illustrates schematically and in an isometric view, the exemplary aspect of the actuating mechanism according to the disclosure according to FIG. 4.
Figure 14:
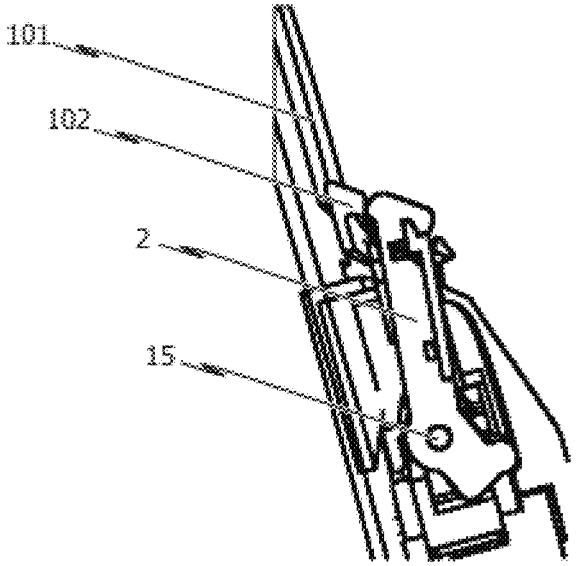
FIG. 14 illustrates schematically and in a lateral view, the exemplary aspect of the actuating mechanism according to the disclosure in a state in which the handle part is in the home position.
Figure 15:
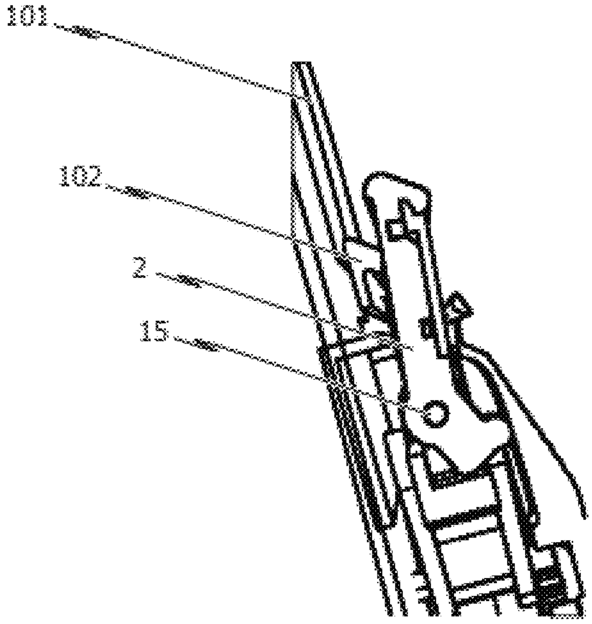
FIG. 15 illustrates schematically and in a lateral view, the exemplary aspect of the actuating mechanism according to the disclosure in a state in which the handle part is in an intermediate position between the home position according to FIG. 14 and the actuating position according to FIG. 16.

As can be seen, for example, from the illustrations in FIG. 2 to FIG. 4, in the actuating position, the handle part 2 in particular protrudes from the vehicle shell at the height of an A-, B-, or C-pillar 100 of the vehicle.

The vehicle further comprises a vehicle door window 101, which is or can be received in the vehicle exterior, in particular in a recessable manner, and is in contact with a window seal 102. Here, it is expedient for the handle part 2 to protrude above the window seal 102 in the actuating position such that the aforementioned gripping region is created between the handle part 2 and the vehicle door window 101.

The actuating mechanism 1 according to the disclosure, as shown in the accompanying drawings, is characterized in particular by the use of a rotary drive to move the handle or handle part 2 parallel and outwardly with the desired stroke.

The necessary parallel movement is achieved by simultaneously connecting two levers 6, 7 to a drive wheel 4. The levers 6, 7 drive a mediator 14 parallel along a defined path (e.g. diagonally). The handle 2 is rotatably mounted on the mediator 14. The movement of the mediator 14 upward triggers a second (outwardly directed) movement of the handle 2. This is achieved by a guide slope in the housing. The extended handle 2 allows for a short outward stroke that provides the trigger signal via a microswitch. A dome spring can be added in order to generate a tactile feedback.

While the present method and/or system has been described with reference to certain implementations, it will be understood by those skilled in the art that various changes may be made, and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

LIST OF REFERENCE NUMERALS

1 Actuating mechanism
2 Handle part
3 Actuator
4 Drive gear
5 Gearing mechanism
6 First lever element
7 Second lever element
8 Curved disk mechanism/first guide groove
9 Curved disk mechanism/second guide groove
10 Guide pin
11 First sensor apparatus
12 Actuating surface for the first sensor apparatus
13 Second sensor apparatus
14 Coupling element/mediator
15 Bearing
16 Spring element
17 Lever element
18 End stop
19 Cover
100 B-pillar
101 Vehicle door window
102 Window seal

What is claimed is:

1. An actuating mechanism for actuating a vehicle door, wherein the actuating mechanism comprises the following:

a manually actuatable handle part, which can be transferred between a home position in which the handle part is recessed in a vehicle shell and an actuating position in which the handle part at least partially or regionally protrudes out of the vehicle shell such that a gripping region is created between the handle part and an exterior of the vehicle, into which the hand or at least one finger of a user can be at least partially inserted; and an actuator associated with the handle part, which is configured so as to transfer the handle part from its home position into its actuating position and vice versa, as needed, wherein the actuator is configured as a rotary drive with a rotationally driven or driveable drive wheel, wherein the actuator comprises a gearing mechanism via which a rotational movement of the drive wheel is or can be switched into a linear movement of the handle part;

wherein the gearing mechanism comprises a first lever element and a second lever element, wherein the first lever element and the second lever element are operatively connected to the drive wheel via a first end region and to a coupling element associated with the handle part via an opposing second end region, respectively;

wherein the drive wheel is at least regionally configured as a gear segment; and wherein, at the first end region of the first lever arm and at the first end region of the second lever arm, one gear segment is provided, via which the corresponding lever arm is operatively connected to the drive wheel.

2. The actuating mechanism according to claim 1, wherein the second end region of the first and the second lever element are operatively connected to the coupling element associated with the handle part via a respective closed cam disk mechanism.

3. The actuating mechanism according to claim 2, wherein the closed cam disk mechanism comprises a first guide groove, in which a guide pin or T-nut provided at the second end region of the first lever element is at least partially or regionally received, and wherein the closed cam disk mechanism comprises a second guide groove, in which a guide pin or T-nut provided at the second end region of the second lever element is at least partially or regionally received.

4. The actuating mechanism according to claim 3, wherein the first and second guide grooves extend at least partially or regionally and at least substantially perpendicular to a longitudinal direction of displacement of the handle part.

5. The actuating mechanism according to claim 1, wherein the handle part is pivotally connected to the coupling element about an axis of rotation extending at least substantially perpendicular to a longitudinal direction of displacement of the handle part.

6. The actuating mechanism according to claim 5, wherein the handle part is connected to the coupling element via a bearing, and is configured so as to be pivotable relative to the coupling element between an unactuated actuating position of the handle part and an actuated actuating position of the handle part upon a manual actuation of the handle part.

7. The actuating mechanism according to claim 6, wherein a spring element is associated with the bearing and is configured so as to bias the handle part into its unactuated actuating position.

8. The actuating mechanism according to claim 1, wherein the actuating mechanism further comprises a first sensor apparatus configured so as to generate an electrical signal for unlocking the vehicle door upon a use of the handle part.

9. The actuating mechanism according to claim 8, wherein the first sensor apparatus is configured so as to detect a pivoting movement of the handle part relative to the coupling element in an actuating position of the handle part, and to generate the electrical signal for unlocking the vehicle door.

10. The actuating mechanism according to claim 9, wherein the handle part is operatively connected to a lever element such that a movement of the handle part that is generated upon a manual actuation of the handle part is or can be transferred to the first sensor apparatus so as to trigger it.

11. The actuating mechanism according to claim 8, wherein the handle part comprises an actuating surface, wherein the first sensor apparatus is configured so as to generate the electrical signal when the actuating surface is contacted or deformed, and wherein the actuating surface is oriented towards the handle region in the actuating position of the handle part.

12. The actuating mechanism according to claim 11, wherein the first sensor apparatus comprises a switch.

13. The actuating mechanism according to claim 1, wherein the actuating mechanism comprises a cover, which closes in the home position of the handle part substantially flush with the vehicle shell or an exterior of a vehicle and covers the handle part.

14. The actuating mechanism according to claim 1, wherein the actuating mechanism is configured so as to move the handle part relative to the vehicle shell in a first plane in order to transfer the handle part between the home position and the actuating position, and wherein the actuating mechanism can be connected to a vehicle shell in such a way that movements of the handle part relative to the vehicle shell outside the first plane are prevented.

15. The actuating mechanism according to claim 1, wherein the actuating mechanism is configured so as to transfer the handle part relative to the vehicle shell between the home position and the actuating position in such a way that the handle part is moved on the one hand out of the vehicle shell and on the other hand away from the exterior of the vehicle.

16. The actuating mechanism according to claim 1, wherein the actuating mechanism comprises a sensor apparatus, which is configured so as to detect an approximation of an authorized operator and, upon detection of an in particular authorized operator, to generate a control signal for transferring the handle part from the home position into the actuating position.

17. The actuating mechanism according to claim 1, wherein the actuating mechanism is configured without a Bowden pull or similar movable machine element for transferring a mechanical movement as well as compressive and tensile forces.

18. An actuating mechanism for actuating a vehicle door, the actuating mechanism comprising:

a manually actuatable handle part transferable between a home position in which the handle part is recessed in a vehicle shell and an actuating position in which the handle part at least partially protrudes out of the vehicle shell such that a gripping region is created between the handle part and an exterior of the vehicle into which at least one finger of a user can be at least partially inserted; and an actuator associated with the handle part and configured to transfer the handle part from the home position into the actuating position and vice versa, the actuator being configured as a rotary drive with a rotationally driveable drive wheel, the actuator comprising a gearing mechanism via which a rotational movement of the drive wheel is switched into a linear movement of the handle part, wherein the gearing mechanism comprises a first lever element and a second lever element, each operatively connected to the drive wheel via a respective first end region and to a coupling element associated with the handle part via a respective opposing second end region, wherein the second end region of each of the first lever element and the second lever element is operatively connected to the coupling element via a respective closed cam disk mechanism, and wherein the closed cam disk mechanism comprises a first guide groove in which a guide pin or T-nut provided at the second end region of the first lever element is at least partially received, and a second guide groove in which a guide pin or T-nut provided at the second end region of the second lever element is at least partially received.

19. The actuating mechanism of claim 18, wherein the first guide groove and the second guide groove each extend at least substantially perpendicular to a longitudinal direction of displacement of the handle part.

20. An actuating mechanism for actuating a vehicle door, the actuating mechanism comprising:

a manually actuatable handle part transferable between a home position in which the handle part is recessed in a vehicle shell and an actuating position in which the handle part at least partially protrudes out of the vehicle shell such that a gripping region is created between the handle part and an exterior of the vehicle into which at least one finger of a user can be at least partially inserted; and an actuator associated with the handle part and configured to transfer the handle part from the home position into the actuating position and vice versa, the actuator being configured as a rotary drive with a rotationally driveable drive wheel, the actuator comprising a gearing mechanism via which a rotational movement of the drive wheel is switched into a linear movement of the handle part, wherein the gearing mechanism comprises a first lever element and a second lever element, each operatively connected to the drive wheel via a respective first end region and to a coupling element associated with the handle part via a respective opposing second end region, wherein the handle part is pivotally connected to the coupling element about an axis of rotation extending at least substantially perpendicular to a longitudinal direction of displacement of the handle part, and wherein the handle part is connected to the coupling element via a bearing and is pivotable relative to the coupling element between an unactuated actuating position of the handle part and an actuated actuating position of the handle part upon manual actuation of the handle part.

* * * * *